United States Patent [19]

Yonemura et al.

[11] Patent Number: 4,589,230
[45] Date of Patent: May 20, 1986

[54] GRINDING MACHINE

[75] Inventors: Shigehiro Yonemura; Hiroshi Umino, both of Sayama; Masao Kume, Tokyo; Mitsuo Abe, Kiyose; Satoshi Miyatake, Kawagoe, all of Japan

[73] Assignee: Honda Giken Kogyo Kabushiki Kaisha, Tokyo, Japan

[21] Appl. No.: 647,815

[22] Filed: Sep. 6, 1984

[30] Foreign Application Priority Data

Sep. 9, 1983 [JP] Japan .................. 58-166117

[51] Int. Cl.$^4$ ............................................ B24B 19/00
[52] U.S. Cl. .................................. 51/95 GH; 51/52 R; 51/165.92
[58] Field of Search ............ 51/95 GH, 52 HD, 52 R, 51/165.92

[56] References Cited

U.S. PATENT DOCUMENTS

| | | | |
|---|---|---|---|
| 2,607,175 | 8/1952 | Osplack | 51/95 GH |
| 2,898,707 | 8/1959 | Rickenmann | 51/95 GH |
| 3,948,001 | 4/1976 | Miyazawa | 51/165.92 |
| 4,014,142 | 3/1977 | Coes | 51/165.92 |
| 4,163,346 | 8/1979 | Matson | 51/165.92 |
| 4,467,568 | 8/1984 | Bloch | 51/95 GH |

Primary Examiner—Harold D. Whitehead
Attorney, Agent, or Firm—Birch, Stewart, Kolasch & Birch

[57] ABSTRACT

A grinding machine including a grinding wheel spindle motor for rotating a grinding wheel, a workpiece spindle motor for rotating a workpiece such as a gear to be ground in mesh with the grinding wheel, and a traverse motor for moving a table supporting the workpiece spindle motor. A power detector and a comparator are connected to a driver circuit for the grinding wheel spindle motor. When a load on the grinding wheel in mesh with the workpiece is increased, such a load increase is detected by the power detector and applied to a comparator. If the load signal is in excess of a reference level, then the application of a drive signal to the traverse motor is interrupted or a speed at which the workpiece is traversed relatively to the grinding wheel is reduced.

8 Claims, 8 Drawing Figures

GRINDING MACHINE

BACKGROUND OF THE INVENTION

The present invention relates to a grinding machine, and more particularly to a gear grinding machine for grinding a workpiece or gear with a short period of time by adjusting the speed of relative movement of the workpiece and a grinding wheel when the workpiece is ground by the grinding wheel as it rotates.

Figure 1:
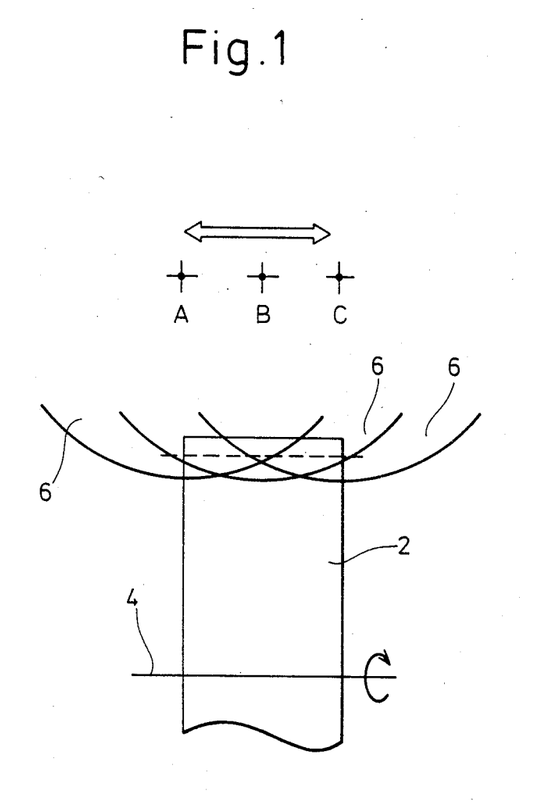
FIG. 1 is a diagram illustrative of the manner in which a grinding wheel is traversed from a position A to a position C with respect to a workpiece.

There have heretofore been used in the art grinding machines for grinding workpieces such as gears with a grinding wheel having helical teeth on an outer peripheral surface thereof which are held in mesh with gear teeth. Since it is necessary to grind the workpiece fully across its width, the workpiece and the grinding wheel are moved relatively to each other in a process known as traversing. FIG. 1 of the accompanying drawings illustrates such a traversing process. The workpiece, designated 2, is rotated about its own axis by a rotating shaft 4, while the grinding wheel, designated 6, is traversed axially of the workpiece 2 from a position A through a position B to a position C to grind the workpiece 2 across the entire width thereof. The workpiece 2 could also be ground across the entire width by moving the workpiece 2 while holding the grinding wheel 6 at rest.

When the grinding wheel 6, that is, the center thereof, is in the position B with respect to the workpiece 2 during the traversing process, the area of contact between the grinding wheel 6 and the workpiece 2 is maximum and so is the load imposed on a motor which rotates the grinding wheel 2. If the workpiece 2 has an eccentric center, varying grinding allowances, or strains caused by a heat treatment before it is ground, then the workpiece itself is not homogeneous, and the load imposed by the workpiece on the grinding wheel varies as the workpiece makes one rotation.

Therefore, the grinding wheel motor is subjected to varying loads due to varous irregularities of the workpiece and the traversing movement of the grinding wheel. At any rate, when the load on the grinding wheel motor exceeds the ability of the grinding machine to control the grinding wheel and the workpiece to operate in synchronism, the accuracy with which the workpiece is ground is appreciably reduced or the grinding wheel is damaged.

Figure 2A:
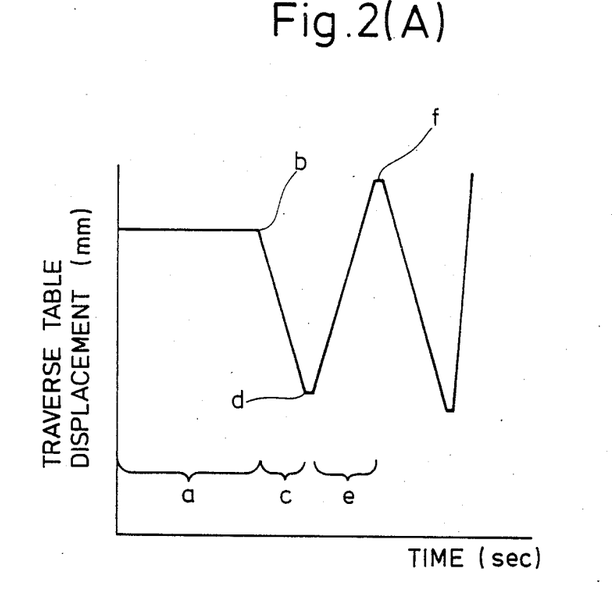
FIGS. 2(A) and 2(B) are graphs showing the relationships of the traverse table displacement and the grinding wheel load to time when a workpiece is ground by a grinding wheel as the grinding wheel is traversed at a constant speed in a conventional grinding machine.
Figure 2B:
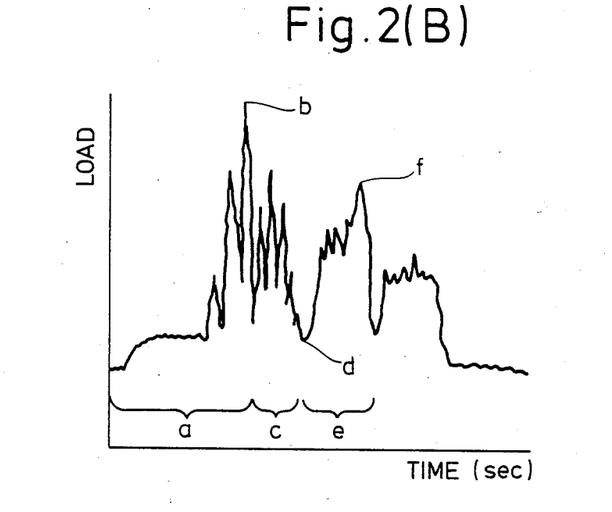

To avoid the foregoing difficulties, prior gear grinding machines are designed such that a maximum load on the grinding wheel motor during traversing movement of the grinding wheel is assumed beforehand, grinding conditions such as a traversing speed, a range of grinding allowances, and the like which match the maximum load are established, and the grinding wheel is traversed according to the established grinding conditions. FIGS. 2(A) and 2(B) of the accompanying drawings shows the relationships of the traverse table displacement and the load to time when the grinding wheel is traversed at a constant speed according to the above process while grinding the workpiece. As shown in FIG. 2(A), the grinding wheel is brought into mesh with the workpiece while positioning the grinding wheel in advance to ensure a small depth of cut to allow the grinding wheel to cut reliably into the workpiece (see a in FIG. 2(A)). As the cutting movement is continued, the load on the grinding wheel is gradually increased (see a in Fig. 2(B)). When the grinding wheel starts being traversed across the workpiece (b in FIG. 2(A)), the load on the grinding wheel motor immediately reaches a peak (b in Fig. 2(B)). On continued traversing movement of the grinding wheel (c in FIG. 2(A)), the load on the grinding wheel motor experiences several peaks (c in FIG. 2(B)) and is then reduced when the traversing stroke is finished (d in FIG. 2(A)). When the grinding wheel starts to be traversed in an opposite direction (e in FIG. 2(A)), the motor load is increased again to a peak (f in FIG. 2(B)) in a final stage of the traversing stroke (f in FIG. 2(A)).

With the conventional arrangement, therefore, if one cycle of traversing movement of the grinding wheel is to be completed within a given period of time irrespectively of variations in the load applied to the grinding wheel motor, the grinding allowance to be ground by the traversing of the grinding wheel is reduced, and any remaining grinding allowance is carried over to a next traversing cycle. As a consequence, the overall grinding time is prolonged. For any workpiece which will impose a load in excess of the predetermined maximum load on the grinding wheel motor, no desired grinding accuracy would be ensured. If such a workpiece were ground, the grinding wheel would tend to be damaged.

With the prior drawbacks in view, it is an object of the present invention to provide a grinding machine which can grind a workpiece in a short period of time and with a sufficient grinding accuracy, and is prevented from being damaged in the grinding operation.

According to the present invention, there is provided a grinding machine comprising a first rotational drive source for rotating a grinding tool, a second rotational drive source for rotating a workpiece to be ground by the grinding tool, means for displacing the grinding tool and the workpiece with respect to each other, and a control unit for controlling the displacement effected by the displacing means dependent on a variation in a load imposed on the first rotational drive source.

The displacing means comprises a traverse table and a traverse motor for moving the traverse table.

The traverse table supports thereon the workpiece and the second rotational drive means, the workpiece being displaceable with respect to the grinding tool by the traverse table in response to energization of the traverse motor.

The displacing means also includes a ball screw coupled to a rotatable drive shaft of the traverse motor for displacing the traverse table in response to rotation of the ball screw about its own axis.

The control unit comprises a control circuit composed of a power detector connected to the first rotational drive source for detecting the load on the first rotational drive source, a comparator connected to an output terminal of the power detector for comparing an output load signal from the power detector and a normal load setting signal, and an adder for adding an output signal from the comparator and a command signal for a feed speed of the traverse table.

The control circuit has a proportional-plus-derivative control circuit connected to an output terminal of the comparator, an analog switch connected to an output terminal of the proportional-plus-derivative control circuit, and a zero-crossing detector connected to the output terminal of the comparator for selectively opening and closing the analog switch in response to the output signal from the comparator to control the application of an output signal from the proportional-plus-derivative control circuit to the adder.

The comparator issues an output signal to the proportional-plus-derivative control circuit by subtracting the output load signal of the power detector from the normal load setting signal.

The adder issues a control signal to the traverse motor by substracting the output signal of the proportional-plus-derivative control circuit from the command signal for the feed speed of the traverse table.

As an alternative, the control unit comprises a power detector connected to the first rotational drive source for detecting the load on the first rotational drive source, a comparator connected to an output terminal of the power detector for comparing an output load signal from the power detector and a normal load setting signal, an amplifier connected to an output terminal of the comparator, a relay connected to an output terminal of the comparator, and a switch selectively openable and closable under the control of the relay for controlling the application of a control signal to the traverse motor.

The switch comprises a normally closed switch which can be opened in response to energization of the relay.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 3:
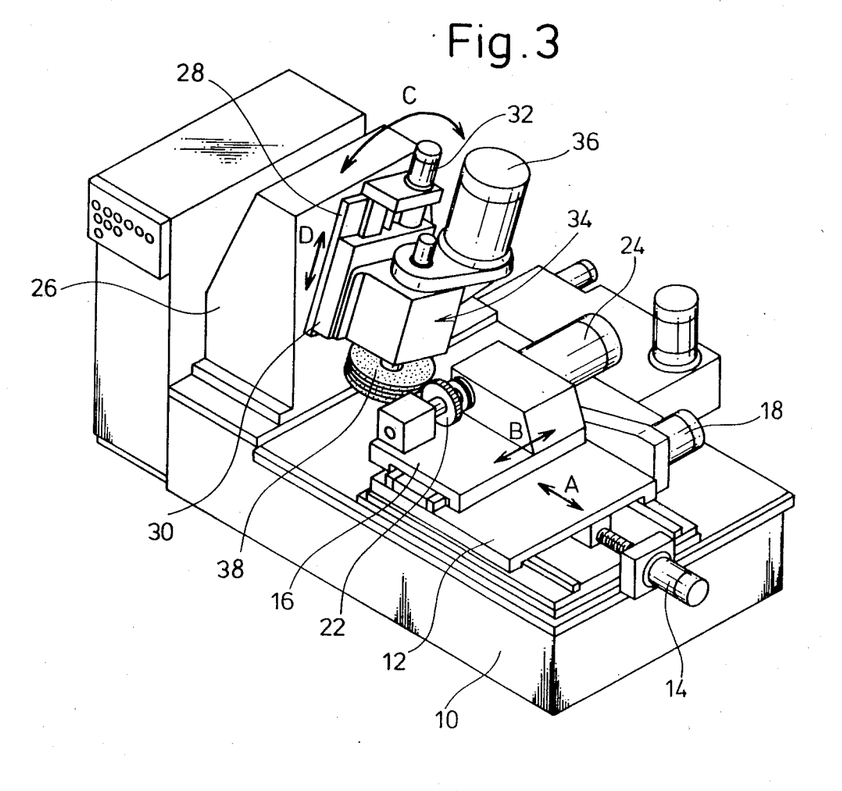
FIG. 3 is an isometric view of a grinding machine according to the present invention.

FIG. 3 illustrates a gear grinding machine according to the present invention. The gear grinding machine includes a bed 10 supporting thereon a feed table 12 movable back and forth in the directions of the arrow A by means of a feed motor 14. A traverse table 16 is mounted on the feed table 12 and movable back and forth in the directions of the arrow B perpendicular to the directions of the arrow A by means of a traverse motor 18. More specifically, when the traverse motor 18 is driven to rotate, a ball screw 20 (FIG. 4) coupled to a rotatable drive shaft of the traverse motor 18 is also rotated to move the traverse table 16 with which the ball screw 20 threadedly engages. A workpiece or gear 22 is detachably mounted on the traverse table 16, the workpiece 22 being rotatable by means of a workpiece spindle motor 24. A column 26 is disposed on the bed 10 in a position aligned with the directions in which the feed table 12 is movable. The column 26 supports a turntable 28 mounted on a side wall surface thereof and turnable in the directions of the arrow C by a motor (not shown) housed in the column 26. A shift table 30 is movably mounted on the turntable 28. The shift table 30 is movable in the directions of the arrow D by a grinding wheel shifting motor 32 and supports a grinding wheel spindle unit 34 thereon. The grinding wheel spindle unit 34 is basically composed of a grinding wheel spindle motor 36 and a circular grinding wheel 38 having several grooves or teeth defined on an outer peripheral surface thereof.

Figure 4:
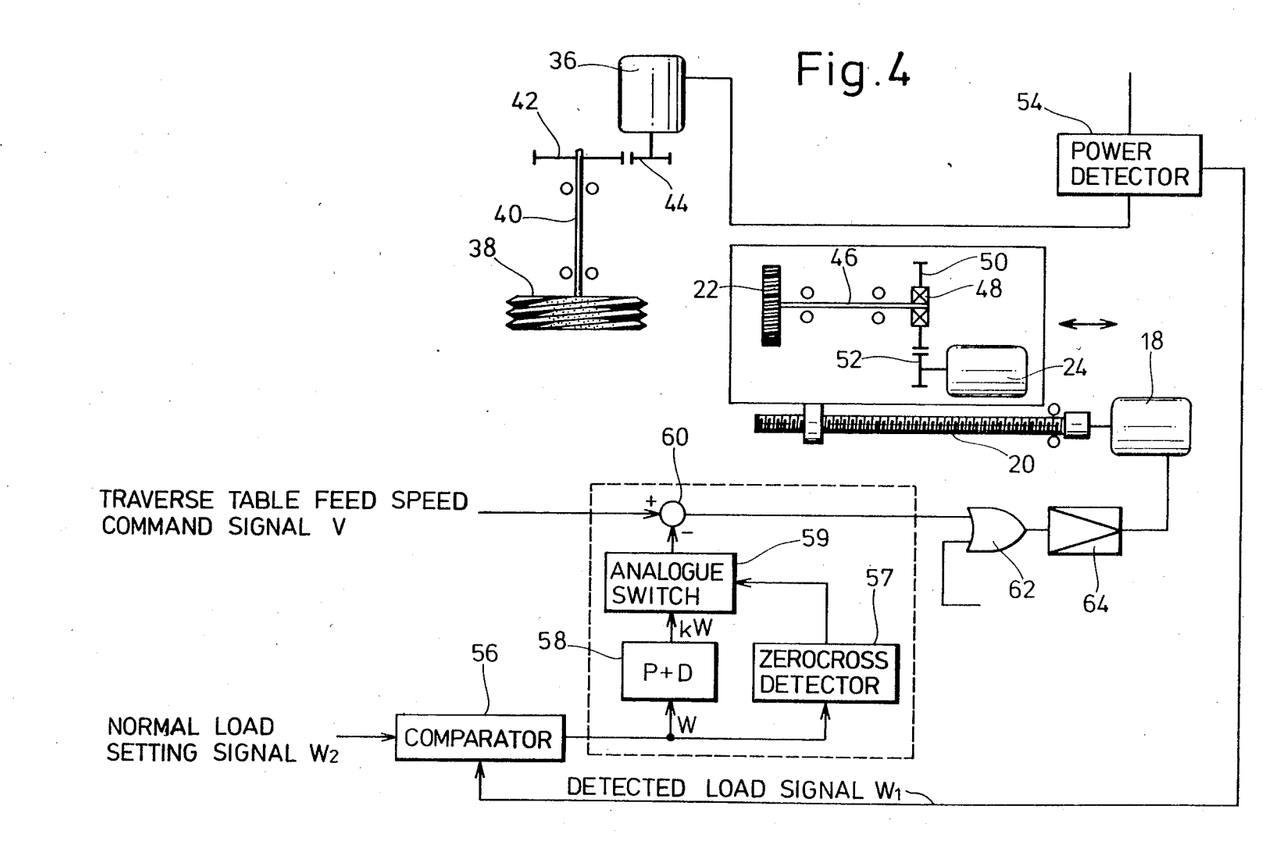
FIG. 4 is a block diagram of an electric traverse control circuit for the grinding machine of the invention.

As illustrated in FIG. 4, a gear 42 of a relatively large diameter is mounted on one end of a rotatable shaft 40 on which the grinding wheel 38 is supported, and is held in mesh with a gear 44 of a smaller diameter directly coupled to the grinding wheel spindle motor 36. Therefore, when the motor 36 is energized, the grinding wheel 38 is rotated about its own axis at a speed governed by a gear ratio and gear diameters. The workpiece or gear 22 to be ground is detachably mounted on one end of a rotatable shaft 46 supporting on the other end thereof a gear 50 of a relatively large diameter through a clutch 48. The gear 50 is held in mesh with a smaller-diameter gear 52 which can be driven to rotate by the workpiece spindle motor 24.

A power supply system for supplying electric power to the grinding wheel spindle motor 36 includes a power detector 54 having an output terminal connected to a comparator 56. The comparator 56 is supplied with a normal load setting signal indicative of a normal load on the grinding wheel spindle motor 36. The comparator 56 has an output terminal connected to both a zero-crossing detector 57 having hysteresis and a proportional-plus-derivative (PD) control circuit 58, which has an output terminal connected to an analog switch 59. The zero-crossing detector 57 has an output terminal connected to the analog switch 59 for opening and closing the same.

The analog switch 59 is connected to an adder 60 having an output terminal connected via one input terminal of an OR gate 62 to an amplifier 64 with its output terminal connected to an input terminal of the traverse motor 18. The other input terminal of the OR gate 62 is supplied with a manually generated signal.

The gear grinding machine of the present invention basically constructed as above will operate and has advantages as follows:

When the feed motor 14 is energized while the grinding wheel spindle motor 36 and the workpiece spindle motor 24 are rotated in synchronism, the feed table 12 is advanced in the direction of the arrow A until the grinding wheel 38 and the workpiece 22 are brought into mesh with each other. For enabling the workpiece 22 to be reliably cut by the grinding wheel 38, an initial feed signal is manually given to the OR gate 62 to energize the traverse motor 18 slightly for setting the workpiece 22 in advance to ensure a small depth of cut to allow the grinding wheel 38 to cut reliably into the workpiece 22.

As the traversing process is started, the workpiece 22 is ground by the grinding wheel in mesh therewith, imposing a load on the rotatable shaft 40. Variations in such a load appear as variations in the electric power consumed to drive the grinding wheel spindle motor 36. The electric power consumed to drive the motor 36 is detected by the power detector 54 and introduced as a detected load signal $W_1$ into the comparator 56 through one of the input terminals thereof. The other input terminal of the comparator 56 is supplied with the normal load setting signal, denoted $W_2$, indicative of a normal load, as described earlier. Since the detected signal $W_1$ is generally produced by an increased load, the detected signal $W_1$ serves as an adding component in the comparator 56 while the normal load setting signal $W_2$ as a subtracting element in the comparator 56. As a consequence, an output signal from the comparator 56 is a signal W indicative of the difference between the detected load signal $W_1$ and the normal load setting signal $W_2$ and applied to the proportional-plus-derivative control circuit 58 and the zero-crossing detector 57. The proportional-plus-derivative control circuit 58 processes the signal W so that the amount of corrective action is proportional to an error of the signal and depends on a derivative of the error, and applies an output signal kW to one of the input terminals of the adder 60. At the same time, the signal W from the comparator 56 is monitored by the zero-crossing detector 57. When the signal W is greater than a prescribed value, the zero-crossing detector 57 closes the analog switch 59 to allow the output signal kW from the proportional-plus-derivative control circuit 58 to be applied to the adder 60. Conversely, when the signal W is smaller than the prescribed value, the zero-crossing detector 57 opens the analog switch 59 to prevent the output signal kW from being applied to the adder 60. The other input terminal of the adder 60 is supplied with a traverse table feed speed command signal V. The output signal kW serves in the adder 60 as a subtracting component since the output signal kW has to act on the command signal V so as to reduce the speed of traversing movement of the traverse table 16. A traverse motor control signal which is produced by subtracting the output signal kW from the command signal V is applied through the OR gate 62 and the amplifier 64 to the traverse motor 18 to reduce the speed of rotation of the traverse motor 18.

Figure 5A:
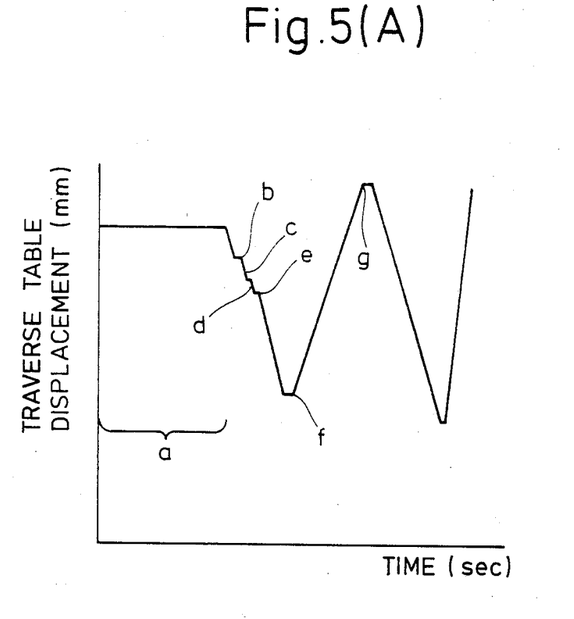
FIGS. 5(A) and 5(B) are graphs illustrative of the relationships of the traverse table displacement and the grinding wheel load to time when a workpiece is ground by a grinding wheel as the grinding wheel is traversed at a speed adjusted dependent on variations in the load.
Figure 5B:
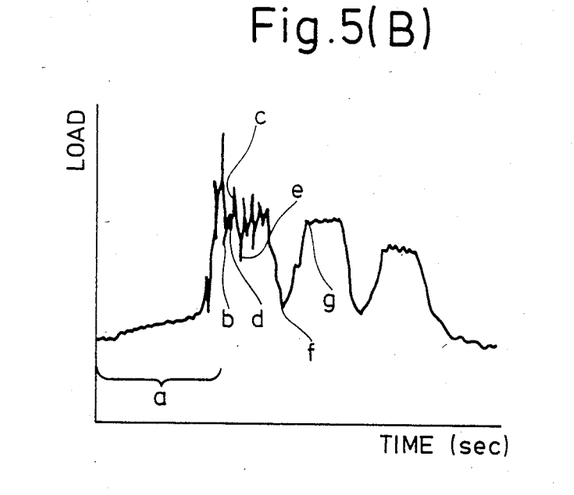

More specifically, when the speed of feed of the traverse table 16 as driven by the traverse motor 18 through the ball screw 20 is reduced at b in FIG. 5(A), the time required for the grinding wheel 38 to grind a certain tooth on the workpiece 22 is increased and the load on the grinding wheel 38 is reduced correspondingly (b in Fig. 5(B)). As the load decreases, the electric power supplied to the grinding wheel spindle motor 36 is also reduced, with the result that the signal $W_1$ detected by the power detector 54 is also reduced and so is the output signal W from the comparator 56. As a consequence, the signal kW issued from the proportional-plus-derivative control circuit 58 is also reduced, thus increasing the difference between the signal kW and the command signal V. The speed of rotation of the traverse motor 18 is increased again to cause the ball screw 20 to move the traverse table 16 at an increased speed.

The above cycle of operation is repeated to traverse the workpiece 22 with respect to the grinding wheel 38 (see c, d, e in FIG. 5(A) and c, d, e in FIG. 5(B)), to enable the grinding wheel 38 to grind the workpiece 22 at rates corresponding to variations in the load. When the traverse motor 18 is reversed after the traversing stroke in one direction has been completed, no abrupt load increase or peak is encountered (see f, g in FIG. 5(B)). The workpiece 22 can be traversed within a preset interval of time (see f, g in FIG. 5(A)).

Although the proportional-plus-derivative control circuit 58 is shown and described in the foregoing embodiment, a proportional-plus-integral-plus-derivative (PID) control circuit may be employed in place of the proportional-plus-derivative control circuit 58.

Figure 6:
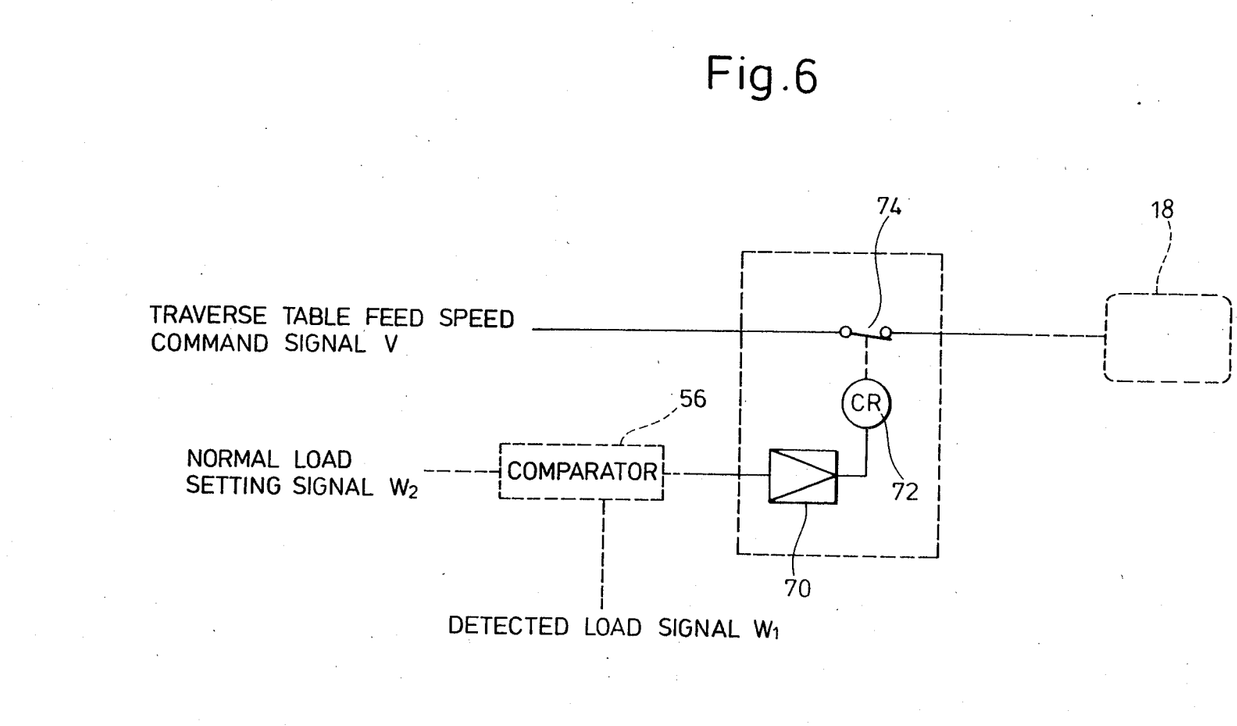
FIG. 6 is a block diagram of a portion of a traverse control circuit according to another embodiment of the present invention.

A control circuit according to another embodiment for a grinding machine is fragmentarily shown in FIG. 6.

As shown in FIG. 6, an amplifier 70 is connected to the output terminal of the comparator 56 and has an output terminal connected to a relay 72 which will control a normally closed switch 74 through which the traverse table feed speed command signal V is transmitted to the traverse motor 18.

In operation, the detected load signal $W_1$ from the power detector 54 (FIG. 4) is applied to the comparator 56, which subtracts the normal load setting signal $W_2$ from the detected load signal $W_1$ and issues an output signal to the amplifier 70. An amplified signal from the amplifier 70 energizes the relay 72 to open the normally closed switch 74 for thereby cutting off the traverse table feed command signal V. As a result, the traverse table 16 is stopped to allow a workpiece which imposes a large load on the grinding wheel to be ground thereby for an increased period of time. When the workpiece is continuously ground over a long period of time, the detected load signal $W_1$ from the power detector is then indicative of a reduced load on the grinding wheel. When the detected load signal $W_1$ is reduced to a level lower than the normal load setting signal $W_2$, as determined by the comparator 56, the comparator 56 produces no output signal and the relay 72 is de-energized. The normally closed switch 74 is closed again to permit the traverse table feed speed signal V to be delivered to the traverse motor 18 for restarting to traverse the workpiece.

With the arrangement of the present invention, as described above, while the grinding wheel and the workpiece in mesh therewith are being relatively traversed, the traverse control is turned on or off or the speed at which the grinding wheel and the workpiece are relatively traversed is varied dependent on the load on the grinding wheel. Therefore, workpieces which have errors greater than normal workpieces can be ground sufficiently under such traverse control. Since the workpiece can be ground to a certain extent in a single traverse stroke, the number of traverse strokes can be reduced, and the time required for grinding the workpiece is eventually shortened. The above traverse control provides for an increased grinding accuracy to allow workpieces that have not been machined well to be ground with ensured accuracy. The traverse control of the invention is effective to relieve the grinding wheel from undue loads and hence protect the grinding wheel from undesired damage.

While the invention has been particularly shown and described with respect to preferred embodiments thereof, it will be understood by those in the art that various changes in form and detail may be made therein without departing from the spirit and scope of the present invention.

What is claimed is:

1. A grinding machine comprising:
  (a) a first rotational drive source for rotating a grinding tool;

(b) a second rotational drive source for rotating a workpiece to be ground by said grinding tool;

(c) means for displacing said grinding tool and said workpiece with respect to each other; and (d) a control unit controlling said displacing means according to change of a load imposed on said first rotational drive source wherein said control unit includes a power detector connected to said first rotational drive source for detecting the load on said first rotational drive source, a comparator connected to an output terminal of said power detector for comparing an output load signal from said power detector and a normal load setting signal, and an adder for adding an output signal from said comparator and a command signal for displacing speed of said displacing means and an output terminal of said comparator is connected to a proportional-plus-derivative control circuit, a zero crossing detector and an analog switch, said zero crossing detector selectively opening and closing said analog switch in response to the output signal from said proportional-plus-derivative control circuit to said adder for controlling said second rotational drive source.

2. A grinding machine according to claim 1, wherein said displacing means comprises a traverse table and a traverse motor for moving said traverse table.

3. A grinding machine according to claim 2, wherein said traverse table supports thereon said workpiece and said second rotational drive means, said workpiece being displaceable with respect to said grinding tool by said traverse table in response to energization of said traverse motor.

4. A grinding machine according to claim 3, wherein said displacing means also includes a ball screw coupled to a rotatable drive shaft of said traverse motor for displacing said traverse table in response to rotation of said ball screw about its own axis.

5. A grinding machine according to claim 1, wherein said comparator issues an output signal to said proportional-plus-derivative control circuit by subtracting said output load signal of said power detector from said normal load setting signal.

6. A grinding machine according to claim 5, wherein said adder issues a control signal to said traverse motor by subtracting the output signal of said proportional-plus-derivative control circuit from said command signal for the feed speed of said traverse table.

7. A grinding machine according to claim 2, wherein said control unit comprises a power detector connected to said first rotational drive source for detecting the load on said first rotational drive source, a comparator connected to an output terminal of said power detector for comparing an output load signal from said power detector and a normal load setting signal, an amplifier connected to an output terminal of said comparator, a relay connected to an output terminal of said comparator, and a switch selectively openable and closable under the control of said relay for controlling the application of a control signal to said traverse motor.

8. A grinding machine according to claim 7, wherein said switch comprises a normally closed switch which can be opened in response to energization of said relay.

* * * * *